United States Patent
Meli et al.

(10) Patent No.: US 8,343,404 B2
(45) Date of Patent: Jan. 1, 2013

(54) METHOD FOR THE PRODUCTION OF CELLULAR MATERIALS

(76) Inventors: Giuseppe Meli, Catania (IT); Giuseppe Recca, Catania (IT); Gianluca Cicala, Valverde (IT); Salvo Ursino, Catania (IT)

( * ) Notice: Subject to any disclaimer, the term of this patent is extended or adjusted under 35 U.S.C. 154(b) by 3 days.

(21) Appl. No.: 12/921,135

(22) PCT Filed: Mar. 6, 2009

(86) PCT No.: PCT/IB2009/005062
§ 371 (c)(1),
(2), (4) Date: Oct. 20, 2010

(87) PCT Pub. No.: WO2009/109863
PCT Pub. Date: Sep. 11, 2009

(65) Prior Publication Data
US 2011/0042865 A1    Feb. 24, 2011

(30) Foreign Application Priority Data
Mar. 7, 2008    (IT) .......................... CT2008U0001 U

(51) Int. Cl.
*B29C 45/14*    (2006.01)
(52) U.S. Cl. ......... 264/156; 264/163; 264/255; 264/257
(58) Field of Classification Search ........................ None
See application file for complete search history.

(56) References Cited

U.S. PATENT DOCUMENTS

| | | | |
|---|---|---|---|
| 3,887,418 A | 6/1975 | Jurisich | 156/197 |
| 4,486,372 A | 12/1984 | Millard et al. | 264/137 |
| 4,668,557 A | 5/1987 | Lakes | 428/131 |
| 5,126,091 A * | 6/1992 | Melton | 264/257 |
| 5,141,690 A | 8/1992 | Marshall | 264/154 |
| 5,246,520 A * | 9/1993 | Scanlon et al. | 156/245 |
| 5,589,015 A | 12/1996 | Fusco et al. | 156/73.1 |
| 5,882,756 A * | 3/1999 | Alston et al. | 428/63 |
| 6,991,755 B2 * | 1/2006 | Reis et al. | 264/36.11 |
| 2003/0066596 A1* | 4/2003 | Van Manen | 156/245 |
| 2005/0017389 A1* | 1/2005 | Petervary et al. | 264/41 |

FOREIGN PATENT DOCUMENTS

| | | |
|---|---|---|
| GB | 1 352 198 | 5/1974 |
| GB | 2235650 A | 3/1991 |
| GB | 2239835 A | 7/1991 |
| GB | 2256611 A | 12/1992 |
| JP | 58059008 | 4/1983 |
| WO | WO 91/01186 | 2/1991 |
| WO | WO 91/01210 | 2/1991 |

* cited by examiner

*Primary Examiner* — Edmund H. Lee
(74) *Attorney, Agent, or Firm* — Fattibene and Fattibene, LLP; Paul A. Fattibene

(57) ABSTRACT

A system and a method for the production of cellular materials are described. In particular, a system and a method for the production of cellular materials with several geometries such as honeycomb geometry, chiral geometry and auxetic geometry are described. The innovative concept of the present invention concerns the pre-formation of the cellular structure by penetration of a reinforcement fabric by means of punches properly structured. The employment of punches housed on one of the matrices of the device allows obtaining several geometries without need of complex fabric pre-formation operations or of manual placement of the fabric in the interstices of the mold.

8 Claims, 8 Drawing Sheets

US 8,343,404 B2

METHOD FOR THE PRODUCTION OF CELLULAR MATERIALS

FIELD OF THE PRESENT INVENTION

The present invention relates to the field of cellular materials. In particular, the present invention relates to the production of cellular materials. Still more in particular, the present invention relates to a device and a method for the production of cellular materials such as auxetic materials.

STATE OF THE ART

Cellular materials are characterized by the presence of cells within their structure. These materials show peculiar mechanical and chemo-physical properties that make them particularly interesting in several fields of engineering. In particular, among cellular materials, the so-called auxetic materials are materials characterized by a negative Poisson's ratio. These materials, when stretched by a traction force, deform themselves by expanding in a plane perpendicular to the plane along which the force is exerted. On the contrary, when compressed, these materials contract transversally with respect to the exerted compression force. Because of these peculiarities, auxetic materials show several mechanical properties particularly relevant in several fields of engineering such as civil, naval and aeronautical engineering. High fracture resistance in fact, typically characterizes auxetic materials. In particular, auxetic materials show peculiar mechanical properties compared to traditional cellular materials. For instance, auxetic materials show peculiar deformation modalities compared to traditional cellular materials. Moreover, these materials are typically extremely light.

Generally, cellular materials exhibit a honeycomb structure, i.e. they have a structure formed by a periodical distribution of regular and symmetrical hexagons.

The production of auxetic materials is widely described in the literature. These materials have been known, in fact, since 1987 and, since then, several production techniques have been developed. U.S. Pat. No. 4,668,557 describes the preparation of auxetic materials as open-celled polymeric foams. In particular, the negative Poisson's ratio is obtained by mechanically deforming the foam by compression. This approach is, therefore, based on the application of a deformation process on a pre-synthesized material, and, being strongly influenced by residual stresses arising from the deformation process, it is characterized by high inaccuracies.

Document WO91/01210 describes a polymeric material with auxetic microstructure formed by microfibrils interconnected at nodes. This material is obtained by a process comprising compacting polymeric particles at high pressure and high temperature followed by deformation of the compacted polymeric material by draw-assisted extrusion through a die so as to produce a cylindrical rod of auxetic material. The process described in this document can, therefore, be divided into three fundamental steps: compaction, sintering and extrusion through a conical die. Since this technique is characterized by the final extrusion step, the production of auxetic materials is limited to the simple extrudate profile with a main axis (the extrusion axis). Therefore, this process does not allow producing materials with complex shapes.

One of the most important application of auxetic materials in the field of composite materials are the so-called "sandwich materials" comprising a core formed by honeycomb structured cellular material, or by a polymeric foam, placed between two external layers formed by composite material laminates or by metal alloys laminates. Typically, the core is glued to the external layers. The main advantages of the sandwich materials are high rigidity and low weight. Moreover, in the last years, a new group of materials alternative to the metal alloys has been widely studied for the formation of sandwich structures. This group comprises the so-called fiber reinforced materials or FRP (fiber reinforced polymers). These materials are particularly advantageous because they are extremely light and they have high specific modulus, high mechanical resistance and high corrosion resistance. Some examples of fiber reinforced laminated materials can be found in the literature (see, for example, W. Yang et al., Journal of Materials Science 39 (2004), pages 3269-3279).

One of the most popular techniques to produce sandwich structured materials employs a series of gears to corrugate a metal sheet which is subsequently glued to a second corrugated sheet in order to obtain the final hexagonal geometry (see for instance, U.S. Pat. No. 3,887,418). Nevertheless, this technique requires the gluing process and it is limited to cellular materials with symmetrical and regular structures. In particular, this technique does not allow obtaining non-symmetrical structures such as chiral structures. Moreover, this technique exhibits further drawbacks due to the fact that the gluing is performed between different materials, as, for example, in the case of honeycomb metal structures used as core material between two laminates formed by a polymeric matrix. In particular, the gluing phase has to be performed after the production of the honeycomb structure.

Document WO91/01886 relates to the production of deformable sandwich panels. The production process therein described implies the employment of a series of dies and rollers to deform a metal sheet that is subsequently converted into a multilayer and lengthwise-folded. The so obtained folded strips are afterwards assembled using adhesive substances and, finally, expanded to form a cellular structure. This technique is therefore limited only to plastically deformable materials such as thermoplastic polymers and metal alloys. Moreover, the process described involves several production steps such as the critical gluing process by using adhesive substances.

A further example of a method for manufacturing composite materials can be found in EPO 314 353 A1.

A further problem connected with cellular materials and, in particular, with honeycomb materials, relates to the unwanted "saddle effect" occurring when these materials are bent. Typically, in fact, these materials are employed for the formation of bent structures such as keels for boats, fuselages for planes or chassis for cars. The "saddle effect" occurs when cellular materials panels are bent in order to obtain bent surfaces. Said effect involves the unwanted bending of some of the sides of the panel in a direction which is opposite to the direction of the wanted bending. The panel, instead of assuming the wanted bent shape, assumes a configuration similar to that of a saddle. In order to overcome this problem, generally, thick panels made of cellular materials are prepared so as to shape the wanted bent surface by removing material from the thick panel. This solution involves, nevertheless, a large waste of materials and an unwanted increase in the productions costs.

OBJECT OF THE PRESENT INVENTION

In view of the cited problems and drawbacks relating to the techniques for producing cellular materials, it is an object of the present invention to provide a system and a method allowing to overcome said problems.

In particular, it is an object of the present invention to provide a system and a method for the production of cellular materials allowing the realization of extremely precise structures. It is a further object of the present invention to provide a system and a method allowing the realization of structures exhibiting several shapes, either simple or complex. In particular, it is an object of the present invention to produce cellular materials with symmetric or non-symmetric shapes, both auxetic and non-auxetic. It is a further object of the present invention to provide a method for the production of sandwich panels comprising an auxetic material core as single pieces without need of gluing and, instead, allowing to integrate in a single piece the external layers and the cellular core component. In particular, it is a further object of the present invention to provide a method for the production of a sandwich panel wherein the cellular material core is not glued to the laminate external layers, but, on the contrary, integrated with the laminate external layers. It is a further object of the present invention to realize cellular materials that, contrary to the traditional honeycomb materials, are bendable without giving rise to the "saddle effect".

SUMMARY OF THE PRESENT INVENTION

The present invention relates to a device and a method for the production of cellular materials with a single molding and with a "single step" production process.

The present invention allows realizing both cellular materials substrates and multilayer structures or sandwich structures comprising at least one layer of cellular material and at least one layer of non-cellular material as single pieces in an integrated way by employing a production technique known as RTM (Resin Transfer Molding). The device herewith described is manually operable or, alternatively, it can be easily adapted for automated processes employing, for instance, hydraulic presses.

The present invention is based on the innovative concept of pre-forming the cellular structure by penetrating a reinforcement fabric with punches properly structured. The employment of punches accommodated in one of the matrices of the device allows obtaining several geometries without the need of complex pre-formation operations of the fabric or of manual depositions of the fabric in the interstices of the mold.

According to a preferred embodiment of the present invention, a method for the formation of a perforated substrate is provided comprising the perforation of a fabric sheet by means of a matrix comprising a specific perforation pattern adapted to penetrate said fabric sheet and the impregnation of the perforated fabric with a resin, said impregnation being performed in the presence of said pattern penetrating said fabric sheet.

According to a further embodiment of the present invention, a method for producing a multilayer structure is provided, comprising the perforation of a first fabric sheet by means of a matrix comprising a base portion and a structured portion comprising a specific perforation pattern adapted to penetrate said first fabric sheet, said first fabric sheet having an upper base and a lower base; removal of at least said base portion of said matrix; placement of a second fabric sheet on at least one of said upper base and lower base of said first fabric sheet; and impregnation of the perforated first fabric sheet and of said second sheet, said impregnation being performed in the presence of at least one not removed portion of said structured portion of said matrix penetrating said first fabric sheet.

According to a particularly advantageous embodiment of the present invention a method for the production of a multilayer structure is provided further comprising the placement of a third fabric sheet on the base of said first fabric sheet where said second fabric sheet has not been placed, said placement being performed before said impregnation.

According to a particularly advantageous embodiment of the present invention a method for the production of a perforated substrate is provided wherein the specific perforation pattern comprises a structure corresponding to one of: honeycomb structure, chiral structure, auxetic structure.

According to a further embodiment of the present invention, a method for the production of a perforated substrate is provided further comprising the cross-linking of the resin impregnating the fabric.

According to a particularly advantageous embodiment of the present invention, a method for the formation of a perforated material is provided wherein a partial cross-linking of the resin impregnating the fabric is performed, the material obtained after the partial cross-linking is bent according to the final bent geometry desired and the complete cross-linking of the structure is finally performed.

According to a further embodiment of the present invention, a mold for the production of cellular materials is provided comprising a matrix comprising a specific perforation pattern, said matrix being configured to perforate a fabric sheet, and a vessel configured to house said matrix and to receive a resin to impregnate the fabric sheet.

According to a further embodiment of the present invention a mold is provided wherein the matrix comprises a base portion and a structured portion comprising the specific perforation pattern.

According to a particularly advantageous embodiment of the present invention a mold is provided wherein at least the base portion is removable from the matrix.

According to a further embodiment of the present invention a mold is provided further comprising a second matrix adapted to drive the specific perforation pattern.

According to a further embodiment of the present invention a mold is provided further comprising a frame adapted to laterally close the mold.

DETAILED DESCRIPTION

In the following, the present invention is described with reference to particular embodiments as shown in the enclosed drawing. Nevertheless, the present invention is not limited to the particular embodiments described in the following detailed description and shown in the figures, but, instead, the embodiments described simply exemplify several aspects of the present invention, the scope of which is defined by the appended claims.

Further modifications and variations of the present invention will be clear for the person skilled in the art. Therefore, the present description has to be considered as including all the modifications and/or variations of the present invention, the scope of which is defined by the appended claims.

Figure 1:
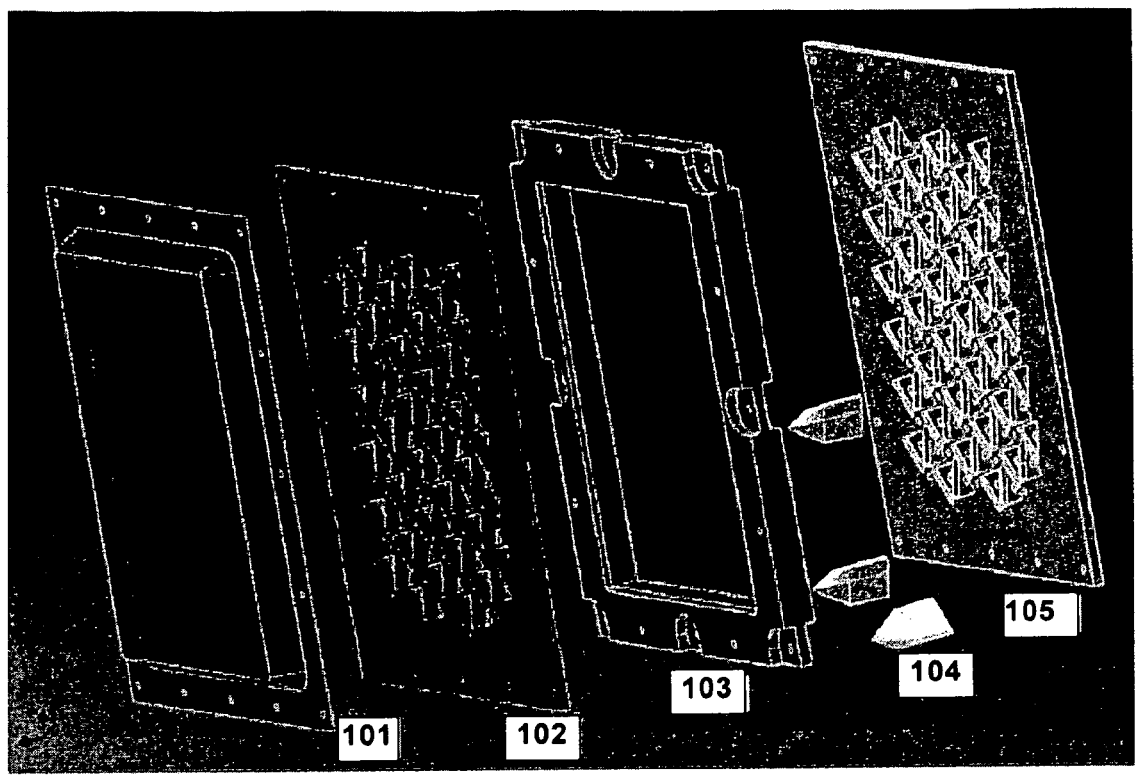
FIG. 1 schematically shows the structure of the device for the formation of cellular materials according to a preferred embodiment of the present invention.

FIG. 1 schematically shows the structure of the device 100 used for the formation of structures comprising cellular materials according to a preferred embodiment of the present invention. The device exhibits a structure formed by a plurality of parallel plates adapted to be stacked. In particular, the device 100 comprises a vessel 101, a driving matrix 102, a frame 103 and a support matrix 105 adapted to support punches 104.

Figure 2:
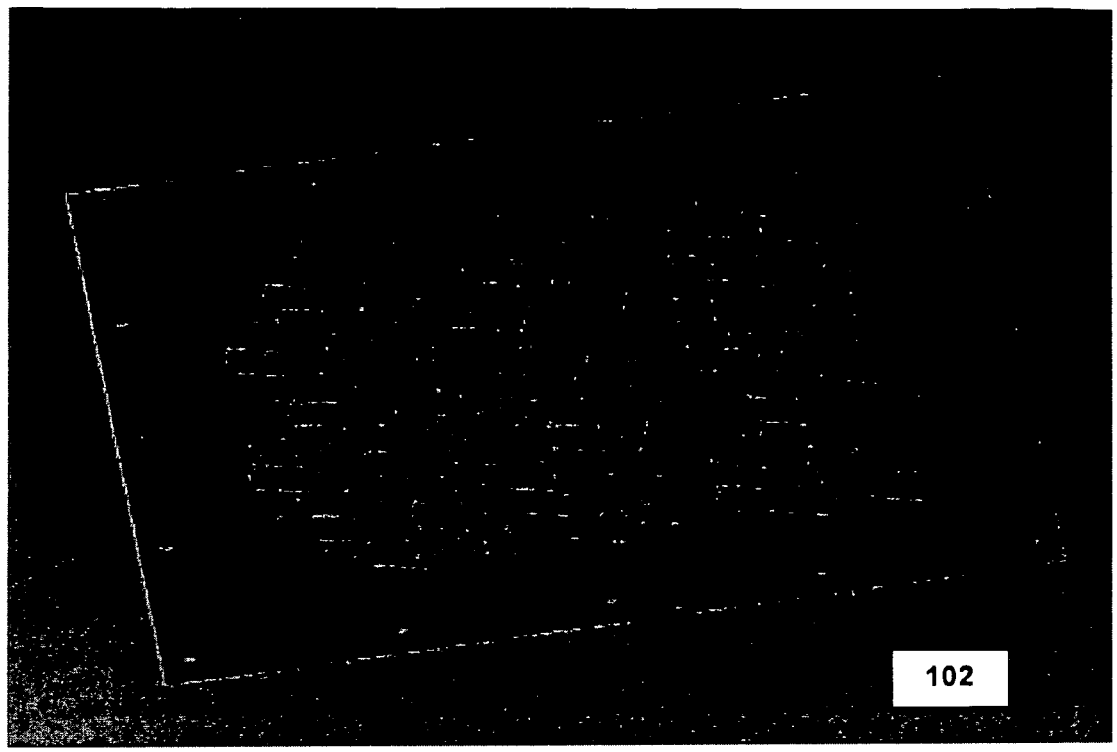
FIG. 2 schematically shows the driving matrix of the device shown in FIG. 1.

The driving matrix 102 is shown in detail in FIG. 2. The driving matrix 102 exhibits a plurality of holes. The holes of the driving matrix 102 are placed and shaped so as to reproduce the structure of the cellular material. In particular, each of the holes of the driving matrix 102 corresponds to one of the cells of the cellular material. The shape of each of the holes of the driving matrix 102 reproduces the section a cell of the cellular material. The arrangement of the holes on the driving matrix 102 reproduces the horizontal cross section of the whole cellular material. The driving matrix 102 has a double functionality of providing a driving function for the punches 104 and of providing the necessary support during the phase of application of the compaction pressure applied by the support matrix 105. In particular, the support matrix 105 can be pressed with high force against the driving matrix 102.

Figure 3A:
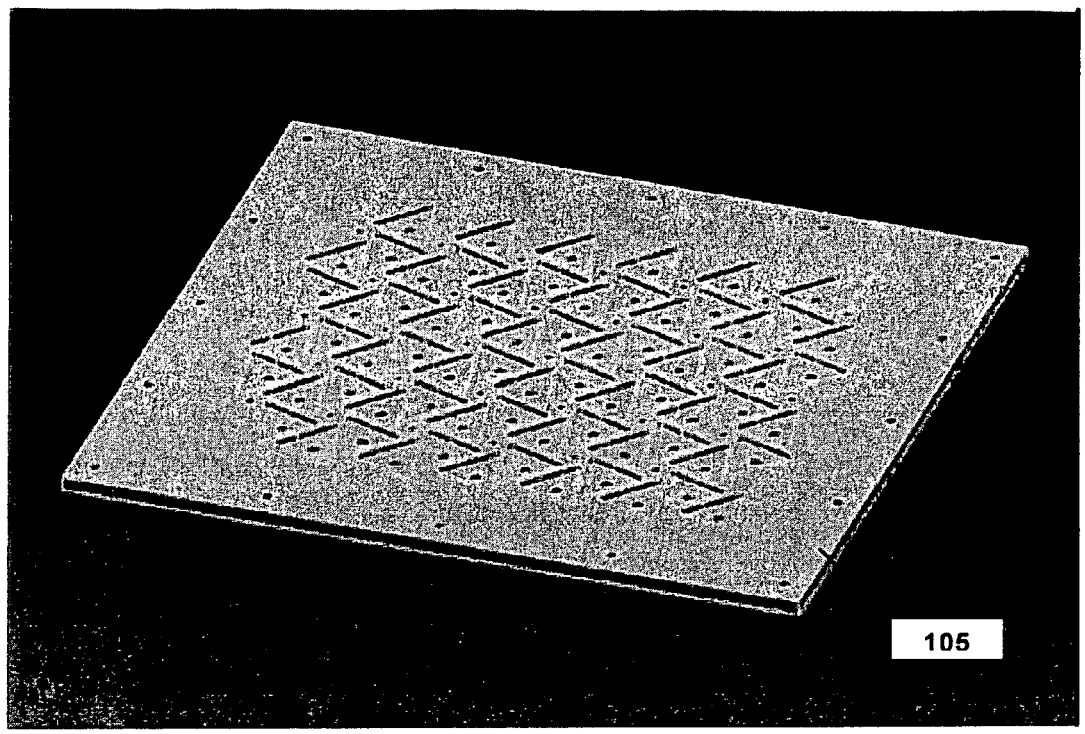
FIG. 3a schematically shows the upper side of the support matrix of the device shown in FIG. 1.
Figure 3B:
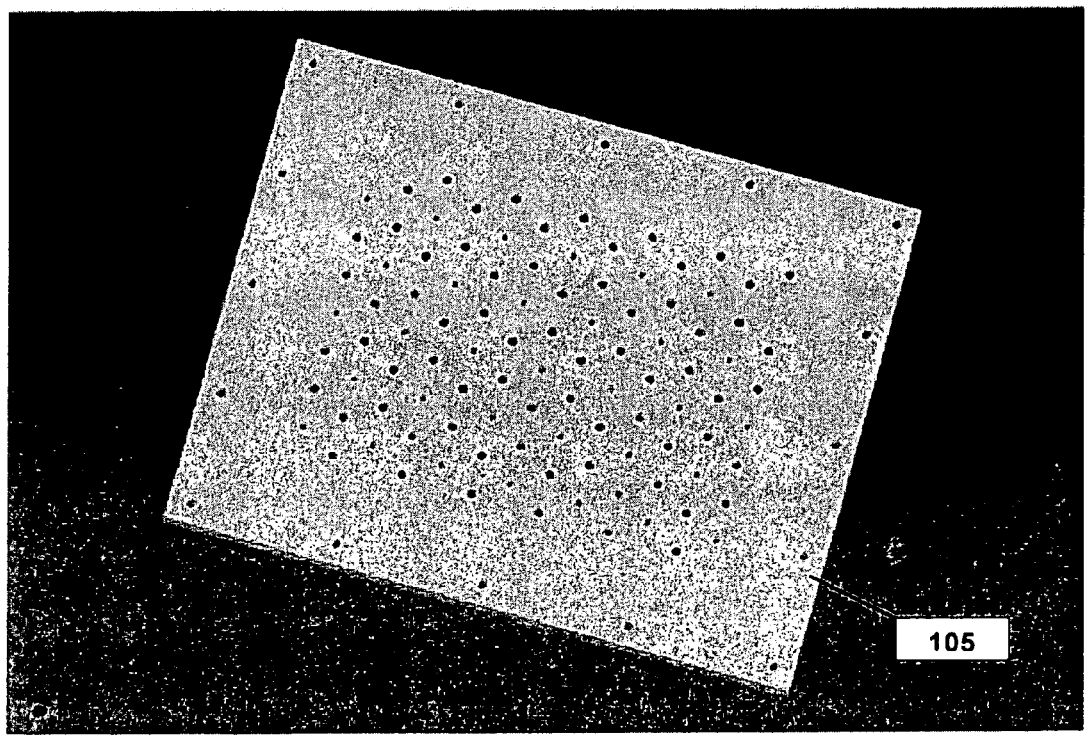
FIG. 3b schematically shows the lower side of the support matrix of the device shown in FIG. 1.

The support matrix 105 is shown in details in FIGS. 3a and 3b wherein both its sides are shown. The lower side of the support matrix 105 (FIG. 3a) is provided with a plurality of seats for the punches 104. The seats are shaped and arranged in such a way to reproduce the structure of the cellular material. In particular, the seats of the support matrix 105 display the same geometry as the holes of the driving matrix 102. Nevertheless, while the driving matrix 102 is perforated from side to side so that the punches 104 can go through said driving matrix 102, the seats of the support matrix 105 are formed as hollows in the support matrix 105.

In particular, this is due to the fact that the seats of the support matrix 105 are employed to accommodate and support the punches 104. Each of the seats formed in the support matrix 105 corresponds to one of the holes formed in the driving matrix 102. As shown in FIG. 3b, each seat is provided with a through hole. The through holes are used to fasten the punches 104 to the support matrix 105. For instance, the punches 104 may :be fastened to the support matrix by means of screws going through the through holes formed within the seats.

The punches 104 exhibit a base portion and a pointed portion. The horizontal cross section of the base portion of each punch reproduces the section of a cell of the cellular material to produce. In particular, the horizontal cross section of the base portion of a punch 104 exhibit the same shape as the hole of the driving matrix 102 through which said punch 104 is driven. Moreover, the horizontal cross section of the base portion of a punch exhibits the same shape as the corresponding seat formed in the support matrix 105. The dimensions of the punches may vary in a wide range of measurements. In particular, the punches 104 may exhibit several lengths and several widths according to the structure of the cellular material to produce. The length of the punches depends on the thickness of the fabrics employed for the production of the cellular materials. Basically, the length of the punches determines the depth of the cells. The width of the punches depends on the lateral dimensions of the cells. The pointed portion of the punches 104 may exhibit several kinds of tips, either extremely pointed or rounded.

Figure 4:
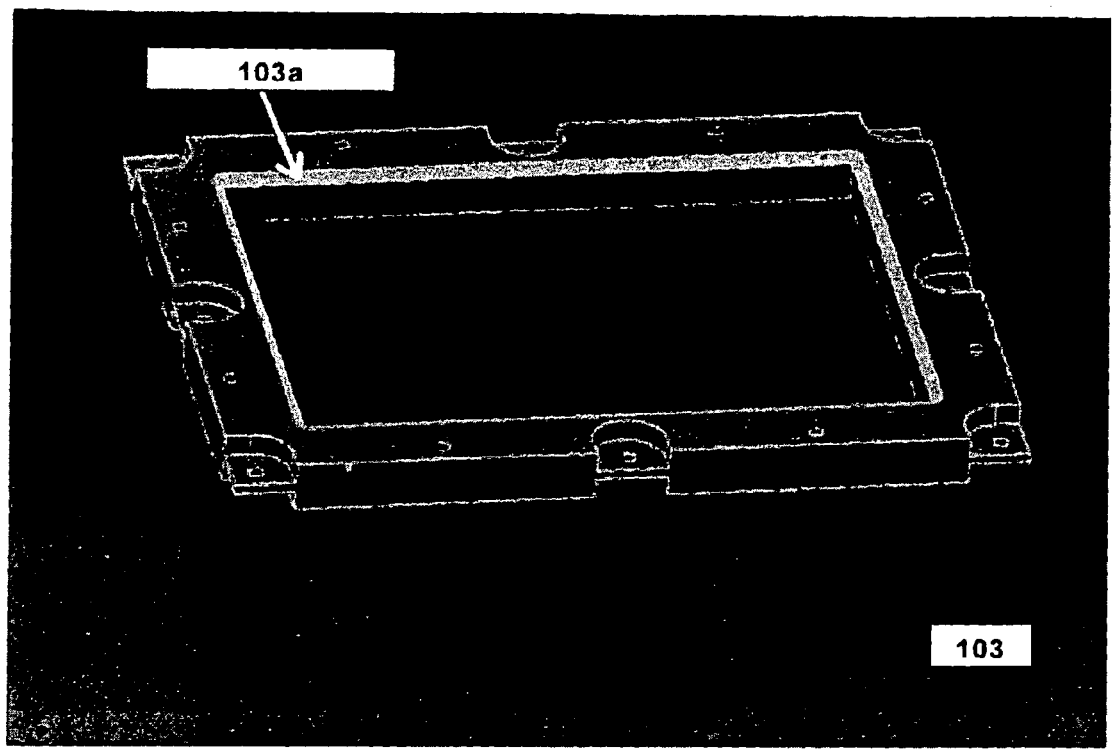
FIG. 4 schematically shows the frame of the device shown in FIG. 1.
Figure 6:
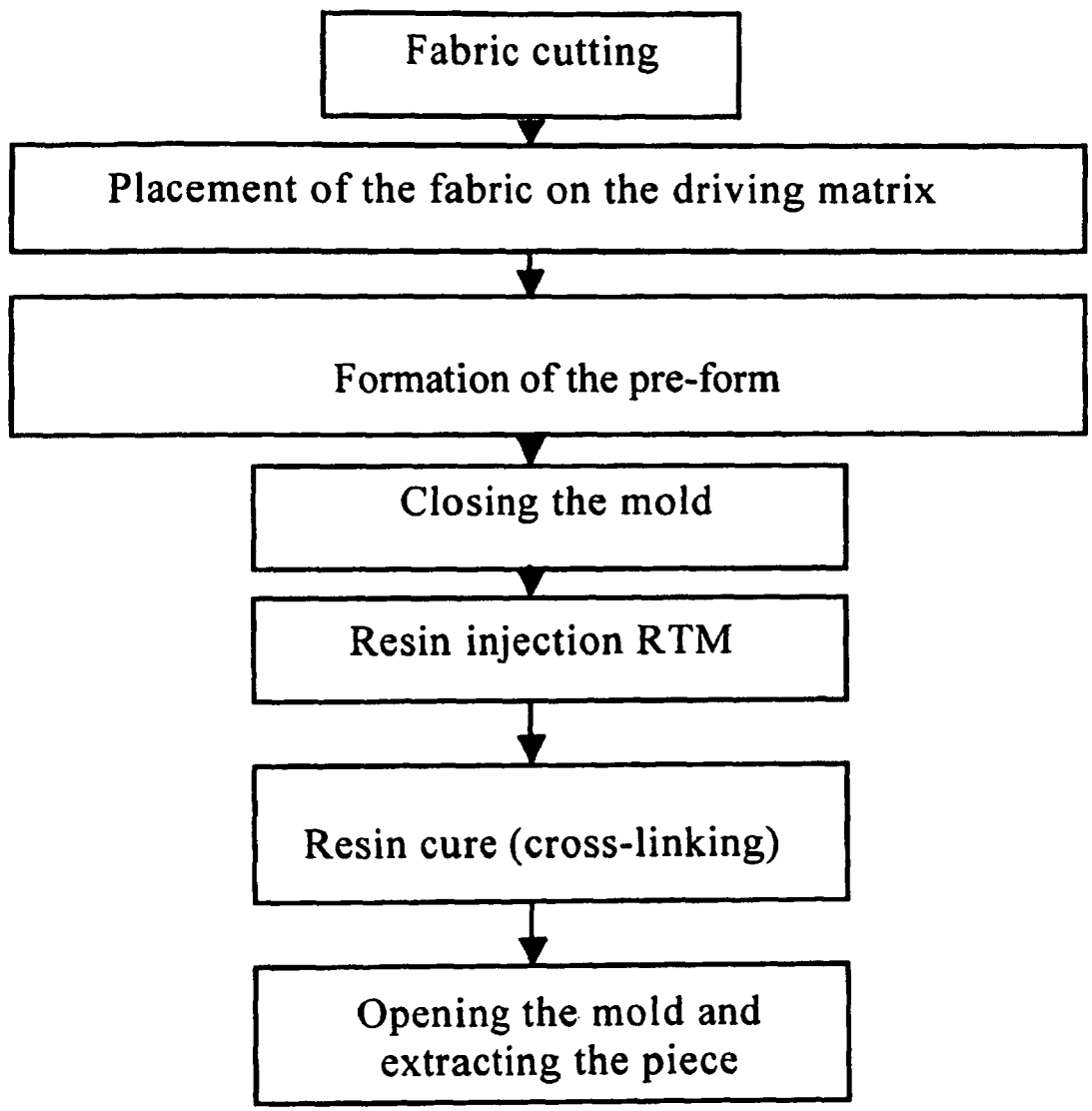
FIG. 6 schematically shows the main steps of a method for the production of a substrate of cellular material.

The frame 103 is schematically shown in FIG. 4. The frame 103 is placed between the driving matrix 102 and the support matrix 105. The frame 103 forms therefore the lateral retaining border of the device 100. As shown in FIG. 6, the internal border of the frame 103 is provided with an injection line 103a that allows injecting the resin inside the device 100 and to bring it in contact with the fabric placed inside the die as described below.

Figure 5:
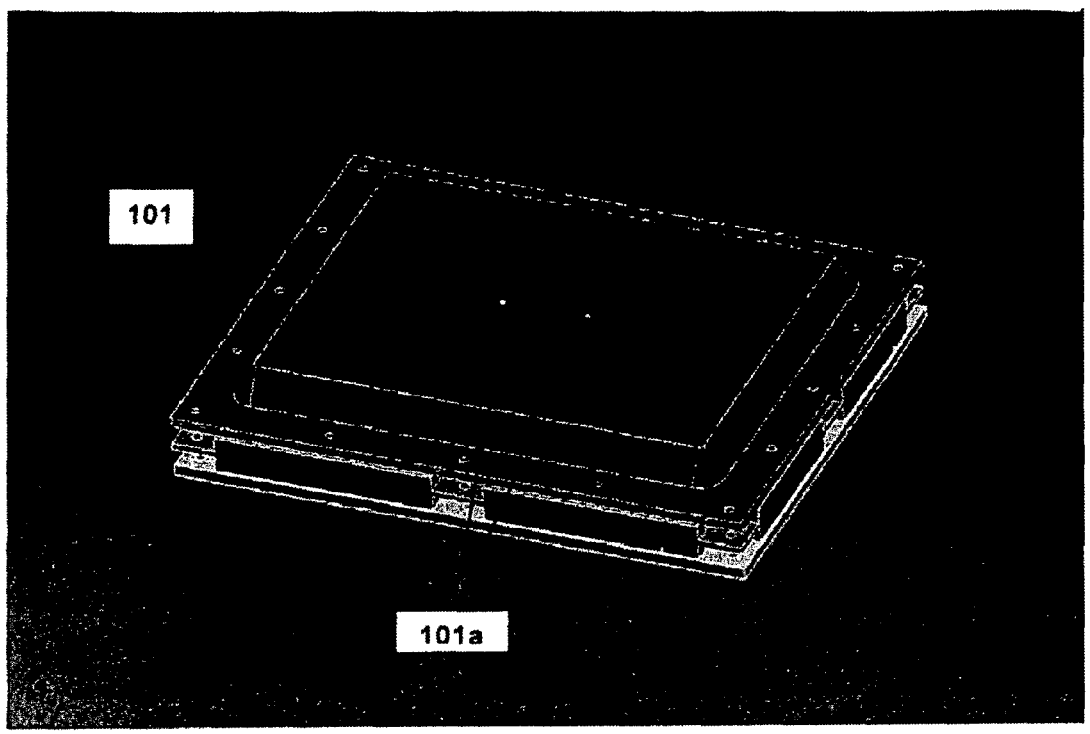
FIG. 5 schematically shows the device shown in FIG. 1 assembled and closed by a vessel.

The vessel 101 is schematically shown in FIG. 5. The vessel allows closing the device 100 and collecting the excess materials employed for the production process described below. For instance, the vessel 101 allows collecting the excess resin and eventually to recycle it for further production cycles. As shown in FIG. 6, the vessel 101 may be provided with holes 101a to remove air from the device. The holes 101a formed in the vessel may be employed to generate vacuum inside the device 100 or, simply, to evacuate the air in excess in the device and avoid the formation of overpressures that could damage the device itself or the materials produced, or of air bubbles that could cause the formation of in homogeneities in the materials produced.

In the following, with reference to FIG. 6, a method for the production of a substrate of cellular material with a device such as the one shown in FIG. 1 is shown. Examples of materials that can be produced according to the present invention comprise auxetic materials, honeycomb materials, chiral materials such as esa-chiral materials, tetra-chiral materials and tri-chiral materials. According to the present invention both symmetric and asymmetric materials can be produced. The geometrical properties of the punches 104, in particular their shape, their dimensions and their arrangement on the support matrix 105 determine the geometrical properties of the cells and, therefore, of the cellular material produces. By varying the parameters relating to the geometrical properties of the punches 104, it is possible to produce cellular materials with various geometrical and structural properties.

The starting material for the production of cellular material comprises the fibers fabric representing the reinforcement material in the structure of the finished cellular material. Examples of fibers fabrics employed comprise carbon fibers, Kevlar fibers, aramid fibers, glass fibers, several natural fibers such as cannabis fibers, linen, jute and, in general, all materials with fibrous nature. It for instance possible to employ Rovicore fabrics produced by Chomarat.

The fabric is cut so as to be placed in the device 100. In particular, the fabric is cut so as to be supported by the driving matrix 102 and to be inserted inside the frame 103.

Figure 7A:
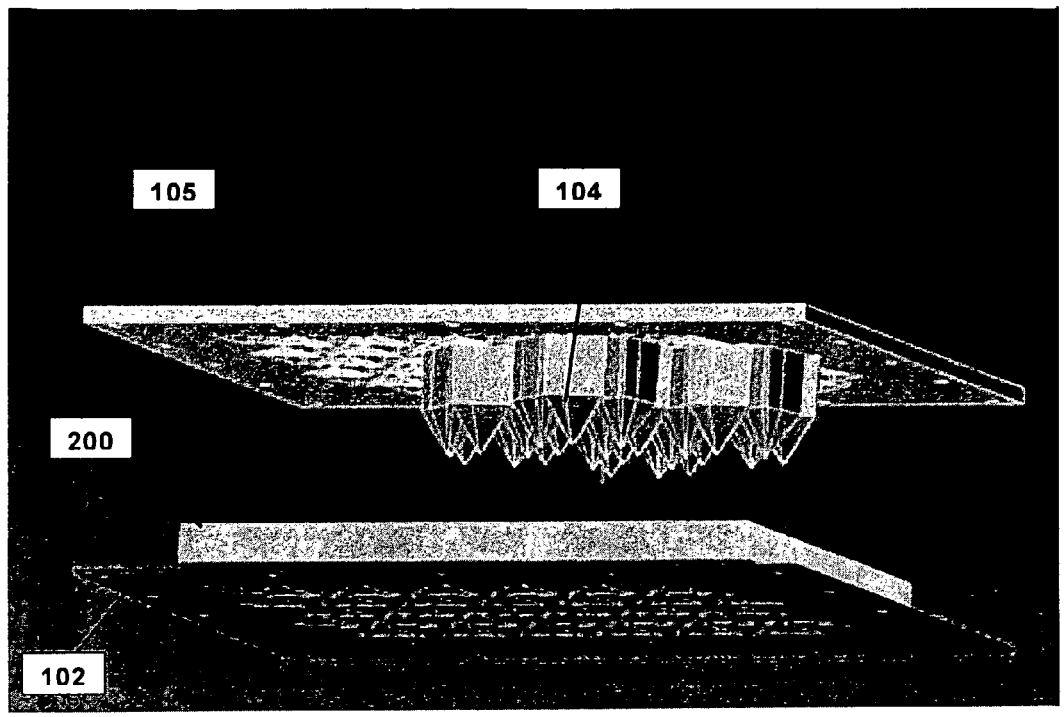
FIG. 7a schematically shows the placement of a portion of reinforcement fabric on the driving matrix of the device shown in FIG. 1.

The cut fabric is placed on the driving matrix 102. FIG. 7a schematically shows a portion of fabric 200 placed on the driving matrix 102.

The fabric is subsequently preformed by penetration. For this purpose, the driving matrix 105 comprising the punches 104 is placed above the driving matrix comprising the fabric 200 and it is pressed against said driving matrix 102.

Figure 7B:
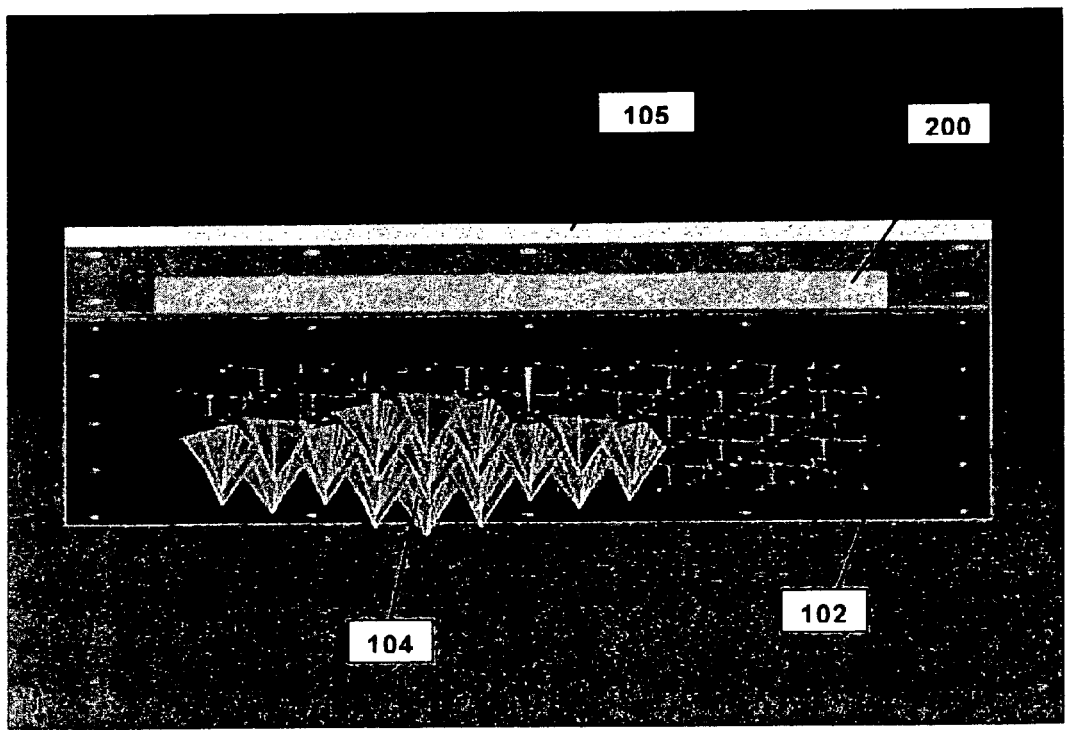
FIG. 7b schematically shows the pre-formation of the reinforcement fabric by means of the punches and of the support matrix of the device shown in FIG. 1.

FIG. 7a shows the support matrix 105 comprising the punches 104 placed above and in correspondence to the driving matrix on which the fabric 200 is placed. When the support matrix 105 comprising the punches 104 is brought close to the driving matrix 102 the pointed portions of the punches get firstly in contact with the fabric and then, bringing the support matrix further closer, penetrate the fabric. Further pressing the support matrix 105 against the driving matrix 102, the punches 104 penetrate the fabric and form within the fabric the hollows corresponding to the cells of the cellular material to produce. As soon as the distance between the driving matrix 102 and the support matrix 105 is lower than the length of the punches, the punches enter the holes formed in the driving matrix and are therefore easily driven. FIG. 7b shows the final situation when the driving matrix 102 is placed at the minimum distance from the support matrix 105. The punches 104 have completely penetrated the fabric and protrude from the holes of the driving matrix 102. Hollows whose shape, dimensions and arrangement correspond to the shape, dimensions and arrangement of the punches 104 are, therefore, formed within the fabric.

It is now possible to close the device 100 by means of the further components. In particular, the device 100 comprising the fabric preformed and perforated by the punches, the driving matrix 102 and the support matrix 105 provided with the punches is laterally closed by the frame 103 and it is provided with the vessel 101.

The method proceeds with the standard procedures of the injection molding process. In particular, the procedures of the resin injection molding process RTM (Resin Transfer Molding) are followed.

For this purpose, it is possible to employ several kinds of resins such as epoxide resins, polyester resins, vinyl ester resins, cyanate ester resins and BMI resins (resins based on Bismaleimide polymers). Preferably, thermosetting resins are employed. Moreover, it is possible to employ biodegradable resins.

The resin is injected in the device 100 so as to completely impregnate the fabric wherein the hollows have previously been formed by the punches 104 as described above. In particular, the injection line 103a in the frame 103 shown in FIG. 4 facilitates the distribution of the resin within the fabric. The resin injection process may be performed with or without vacuum. In general, in this phase of the process, it is possible to employ all the solutions and alternatives known in the field of resin injection molding RTM.

The resin cure phase follows the injection phase of the resin. The parameters employed in this phase, in particular the temperatures achieved, depend strongly on the materials (in particular the resin) involved in the process. The method according to the present invention is not limited to special choices of the temperatures. In particular, by choosing appropriate materials for the matrices employed, it is possible to employ the method of the present invention in several ranges of temperatures. The heating of the system formed by the device 100 comprising the fabric wherein the hollows have been formed by the punches 104 and impregnated with the resin may be performed either within appropriate ovens, or heating the device 100 itself by electric resistances. The time of the resin cure phase depends on the materials involved in the process too.

In the case that bent panels for specific applications are to be produced, the resin cure process may be performed in two steps. Initially, a partial cross-linking of the resin is performed after the fabric perforation and impregnation processes as described above. Partial cross-linking may be achieved controlling the time of the curing phase. Alternatively, partial cross-linking may be achieved controlling the curing phase temperatures. Subsequently, the material obtained with the partial cross-linking process is bent according to the final desired shape. Finally, the complete cross-linking of the so obtained bent material is performed. In this way it is possible to obtain bent cellular material panels avoiding the formation of the unwanted "saddle effect". In particular, during the bending process of the cellular material wherein the cross-linking has only partially occurred, it is possible to shape the material according to several shapes, in particular according to several bent shapes with several radiuses of curvature, avoiding the "saddle effect". The subsequent complete cross-linking allows obtaining the final stable material.

When the system has properly cooled off, it is possible to open the device 100 and extract the finished cellular material.

Figure 8:
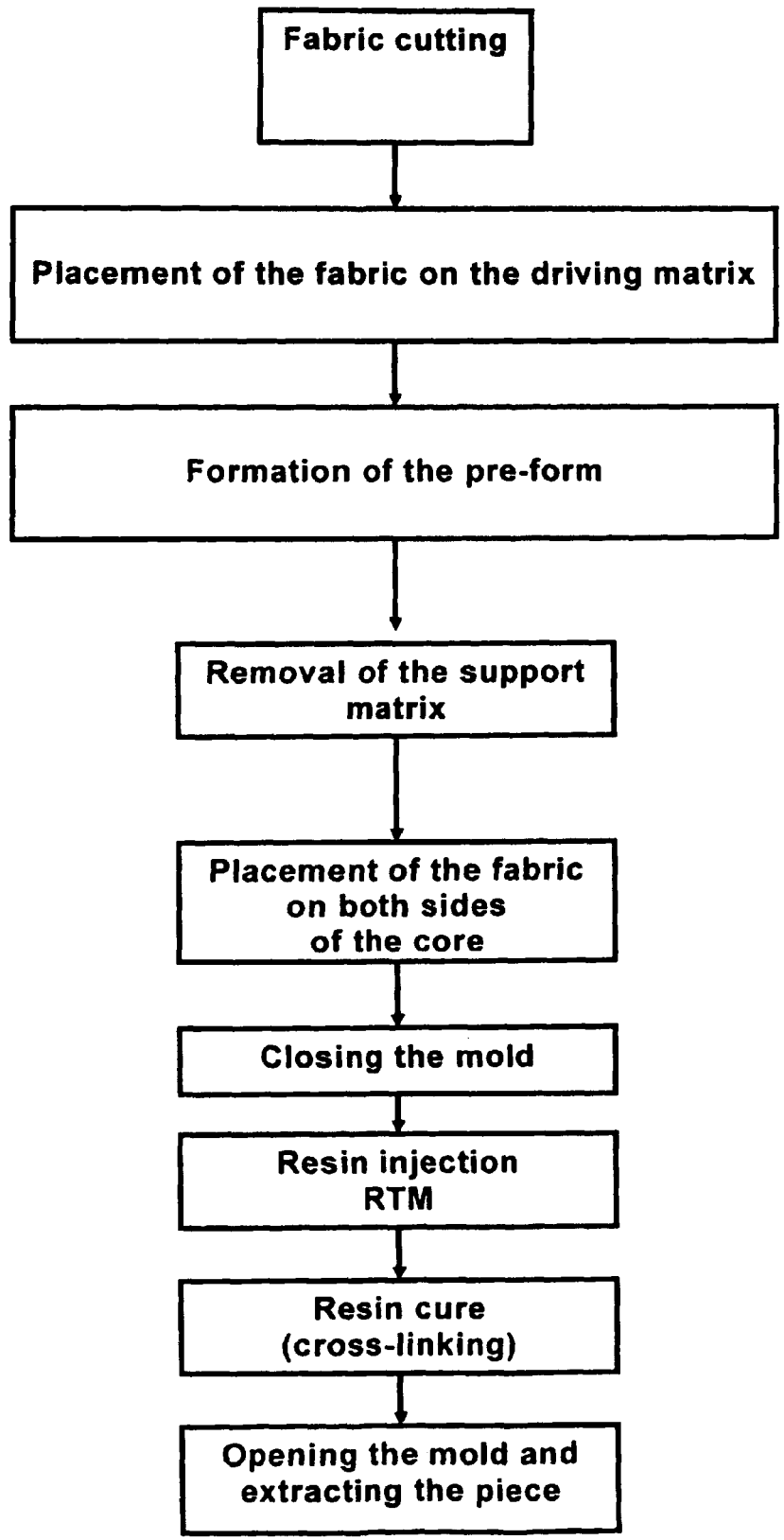
FIG. 8 schematically shows the main steps of a method for the production of a sandwich material comprising a core of cellular material.

In the following, with reference to FIG. 8, a method for the production of a layered material comprising a cellular material substrate by means of a device such as the one shown in FIG. 1 is described. The method for the production of a layered material comprising a cellular material substrate is similar to the method for the production of a cellular material substrate described above.

In particular, as in the case described above, a portion of fabric forming the cellular substrate in the layered material is cut so as to be positioned on the driving matrix 102 and to be housed within the frame 103. The process proceeds with the formation of the preformed fabric by pushing the support matrix 105 provided with the punches 104 towards the driving matrix 102 so as to create within the fabric the holes corresponding to the cells of the cellular material core.

The support matrix 105 is subsequently removed from the punches 104. In particular, the fastening means fastening the punches 104 to the support matrix 105 are removed. If, for example, the punches 104 are fastened to the support matrix with screws, said screws are unscrewed. In this way it is possible to remove the support matrix 105 from the system, while the punches 104 remain thrust within the fabric in the positions corresponding to the cells of the cellular material core. For this reason, while in the case described above concerning the formation of a cellular material substrate it is possible to employ punches 104 made of several materials such as metals, in this case it is preferable to employ punches made of appropriate materials such as light polyurethane foams. According to preferred embodiments of the present invention, the punches may be hollow so as to further reduce the weight of the final structure. In general, it is preferable that the punches should be light and formed by thermoplastic materials.

After removing the support matrix 105, fabric sheets are placed on both the upper and lower sides of the preformed and perforated fabric comprising the punches. These sheets form the polymeric structure of the upper and lower bases of the sandwich material.

In these cases, it is preferable that the length of the punches should correspond to the thickness of the perforated fabric. Nevertheless, in case some portions of the punches (in particular, the base, the apex or both) protrude from the perforated fabric, it is possible to drown said protruding portions within the fabrics employed to cover the bases of the perforated fabric. In particular, in case the apex of the punches protrudes from the lower base of the perforated fabric sheet, said apex is drown within the non-perforated fabric sheet placed on said lower base. In case the base of the punches protrudes from the upper base of the perforated fabric sheet, said base is drown within the non-perforated fabric sheet placed on said upper base.

The process proceeds with the resin injection molding process RTM in a similar way as that described above. In particular, the device 100 comprising the perforated fabric comprising the punches and provided with at least one sheet of fabric on one of the upper and lower bases or on both bases is closed, the resin is injected and the resin cure process is performed.

When the system has properly cooled off, it is possible to open the device 100 and extract the finished sandwich material comprising the cellular material core.

In this way, a sandwich material is produced with a single step process and no gluing process between the cellular core and the external sheets is necessary. On the contrary, in this case, both the structure of the cellular core and the structure of the external layers are produced at the same time during the cross-linking process of the resin and the final fibro reinforced sandwich material is particularly stable and resistant.

According to alternative embodiments of the present invention, instead of producing sandwich structures, it is possible to place at least one sheet of fabric on at least one of the upper or lower bases of the preformed and perforated fabric comprising the punches so as to obtain a multilayer structure comprising one layer of cellular material and at least one uninterrupted layer.

With the present invention, it is furthermore possible to obtain multilayer bent panels comprising cellular materials. In a similar way to what described above with respect to the formation of single layer bent panels, also in this case the cross-linking of the system obtained after having placed at least one sheet of fabric on at least one of the upper or lower bases of the preformed perforated fabric comprising the punches is performed in two steps. A partial cross-linking of the multilayer system is therefore performed. The system is subsequently bent according to the requested geometry of final panel. Finally, the complete cross-linking of the partially cross-linking bent system is performed.

It has been shown, therefore, that the present invention provides an improved device suitable for the production of composite structures with plane section and having asymmetric chiral geometry or auxetic geometry.

Moreover, the present invention provides a device characterized in that the shaping occurs by penetration of dry fabrics comprising reinforcement fibers, without any limitation to the type and kind of fibers and to the type and shape of the penetrating punches.

Furthermore, the present invention provides a device characterized in that by penetrating the dry fabrics the shaping of the fabrics is performed allowing to produce multilayer panels with a core with cellular structure with chiral or auxetic geometry and with integrated external covering layers, avoiding, therefore, gluing processes.

Moreover, the present invention provides a device characterized in that with the penetration of the dry fabrics, the shaping of cellular structures with chiral or auxetic geometry is performed employing resin transfer techniques, with or without vacuum, also named RTM injection or infusion techniques.

Furthermore, the present invention provides a device and a method allowing producing bent cellular materials panels, both monolayer and multilayer with one cellular material layer and one or more non-cellular material layers.

The invention claimed is:

1. A method for producing a perforated material comprising the steps of:
   perforation of a first fabric sheet by means of a matrix comprising a specific perforation pattern adapted to penetrate the first fabric sheet; and
   impregnation of the perforated first fabric sheet with a resin, said step of impregnation being performed in the presence of the specific perforation pattern penetrating the first fabric sheet
   wherein the matrix comprises a base portion and a structured portion comprising the specific perforation pattern adapted to penetrate the first fabric sheet, the first fabric sheet having an upper base and a lower base;
   and in that said method further comprises the steps of:
   removal of at least the base portion of the matrix;
   placement of a second fabric sheet on at least one of the upper base or the lower base of the first fabric sheet; and
   impregnation of the perforated first fabric sheet and of the second fabric sheet, said step of impregnation being performed in the presence of at least one not removed portion of the structured portion of the matrix penetrating the first fabric sheet.

2. Method according to claim 1, further comprising the step of:
   placement of a third fabric sheet on the base of the first fabric sheet where the second fabric sheet has not been placed, said placement step being performed before said impregnation step.

3. Method according to claim 1, wherein the specific perforation pattern comprises a structure selected from the group consisting of a honeycomb structure and chiral structure.

4. Method according to claim 1, further comprising the step of cross-linking of the resin.

5. Method according to claim 4, comprising the further steps of:
   partial cross-linking of the resin so as to obtain a partially cross-linked material;
   bending of the partially cross-linked material so as to obtain a partially cross-linked bent material; and
   complete cross-linking of the partially cross-linked bent material.

6. Method according to claim 1, wherein the perforated material is selected from the group consisting of a cellular material and an auxetic material.

7. A method of producing a cellular material structure having cells comprising the steps of:
   placing a fabric sheet adjacent a driving matrix having a plurality of holes;
   moving a plurality of punches through the fabric sheet and the plurality of holes in the driving matrix, whereby the fabric sheet is preformed and perforated by the plurality of punches;
   sealing a device containing the fabric sheet and the plurality of punches;
   injecting a resin into the device while the plurality of punches are held in position through the fabric sheet and the plurality of holes in the driving matrix, whereby the fabric sheet is impregnated with the resin;
   waiting a predetermined time for the resin to at least partially set;
   removing the plurality of punches from the fabric sheet and the plurality of holes in the driving matrix; and
   removing the fabric sheet,
   whereby cells having a shape of the plurality of punches is formed in the fabric producing a cellular material structure.

8. A method of producing an integral multilayer cellular material structure having a first layer of cells and a second uninterruptable layer comprising the steps of:
   placing a first fabric sheet adjacent a driving matrix having a plurality of holes;
   attaching a plurality of punches to a support matrix;
   moving the plurality of punches through the first fabric sheet and the plurality of holes in the driving matrix, whereby the first fabric sheet is preformed and perforated by the plurality of punches;

sealing a device containing the first fabric sheet and the plurality of punches;

injecting a resin into the device while the plurality of punches are held in position through the first fabric sheet and the plurality of holes in the driving matrix, whereby the fabric sheet is impregnated with the resin;

waiting a predetermined time for the resin to partially set;

removing the support matrix from the plurality of punches leaving the plurality of punches within the first fabric sheet;

placing a second fabric sheet on said first fabric sheet, wherein the plurality of punches do not extend thorough the second fabric sheet;

re-sealing the device;

continuing to inject resin into the device;

curing the resin; and removing the first fabric sheet and the second fabric sheet from the device, whereby the integral multilayer structure is formed having the first layer with cells having a shape of the plurality of punches in the first fabric sheet and the second uninterruptable layer is formed from the second fabric sheet.

* * * * *